United States Patent
Cordes et al.

(10) Patent No.: US 11,520,704 B1
(45) Date of Patent: Dec. 6, 2022

(54) WRITING STORE DATA OF MULTIPLE STORE OPERATIONS INTO A CACHE LINE IN A SINGLE CYCLE

(71) Applicant: INTERNATIONAL BUSINESS MACHINES CORPORATION, Armonk, NY (US)

(72) Inventors: Robert A. Cordes, Austin, TX (US); Bryan Lloyd, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 43 days.

(21) Appl. No.: 17/364,495

(22) Filed: Jun. 30, 2021

(51) Int. Cl.
*G06F 12/0875* (2016.01)
*G06F 12/0811* (2016.01)
*G06F 9/30* (2018.01)
*G06F 12/02* (2006.01)
*G06F 12/0804* (2016.01)

(52) U.S. Cl.
CPC ...... *G06F 12/0875* (2013.01); *G06F 9/30043* (2013.01); *G06F 12/0246* (2013.01); *G06F 12/0804* (2013.01); *G06F 12/0811* (2013.01)

(58) Field of Classification Search
CPC ............. G06F 12/0875; G06F 12/0246; G06F 12/0804; G06F 12/0811; G06F 9/30043
See application file for complete search history.

(56) References Cited

U.S. PATENT DOCUMENTS

| | | |
|---|---|---|
| 9,588,888 B2 | 3/2017 | Nickel et al. |
| 10,379,784 B1 | 8/2019 | Sethuraman et al. |
| 10,430,088 B2 | 10/2019 | Hwang et al. |
| 10,949,122 B2 | 3/2021 | Sethuraman et al. |
| 2018/0232181 A1* | 8/2018 | Zhou ...................... G06F 3/0679 |
| 2018/0359302 A1* | 12/2018 | Gong ............... H04N 21/85406 |
| 2021/0034237 A1* | 2/2021 | Cerny ................. G06F 12/1408 |
| 2021/0034583 A1* | 2/2021 | Cerny ..................... G06F 3/064 |
| 2021/0266538 A1* | 8/2021 | Gao ..................... H04N 19/132 |
| 2021/0281870 A1* | 9/2021 | Solovyev ............. H04N 19/159 |

OTHER PUBLICATIONS

Improving Data Transfer Rate and Throughput of HDFS Using Efficient Replica Placement; Patel, NM et al.; Jan. 2014.
MIPS Pipeline, Weatherspoon, H.; 2012.
(Continued)

*Primary Examiner* — Prasith Thammavong
(74) *Attorney, Agent, or Firm* — Brian F. Russell; Brian Restauro (57) ABSTRACT

A load-store unit (LSU) of a processor core determines whether or not a second store operation specifies an adjacent update to that specified by a first store operation. The LSU additionally determines whether the total store data length of the first and second store operations exceeds a maximum size. Based on determining the second store operation specifies an adjacent update and the total store data length does not exceed the maximum size, the LSU merges the first and second store operations and writes merged store data into a same write block of a cache. Based on determining that the total store data length exceeds the maximum size, the LSU splits the second store operation into first and second portions, merges the first portion with the first store operation, and writes store data of the partially merged store operation into the write block.

20 Claims, 4 Drawing Sheets

(56) References Cited

OTHER PUBLICATIONS

Micro-Operation Cache: A Power Aware Frontend for Variable Instruction Length ISA, Solomon, B. et al.; Aug. 2001.
Lockless Circular Buffer over Shared Memory, Anonymously; Apr. 5, 2013.
NDRange Mechanism for Improving Memory Object I/O Throughput, Anonymously; Mar. 12, 2013.

* cited by examiner

WRITING STORE DATA OF MULTIPLE STORE OPERATIONS INTO A CACHE LINE IN A SINGLE CYCLE

BACKGROUND OF THE INVENTION

The present invention relates to cache memories in general, and, in particular, to a method for writing store data of multiple store operations into a cache line in a single cycle.

A conventional multiprocessor (MP) computer system, such as a server computer system, includes multiple processing units all coupled to a system interconnect, which typically includes one or more address, data and control buses. Coupled to the system interconnect is a system memory, which represents the lowest level of memory in the multiprocessor computer system and which generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

Cache memories are commonly utilized to temporarily buffer memory blocks that might be accessed by a processor in order to speed up processing by reducing access latency introduced by having to load needed data and instructions from system memory. In some MP systems, the cache hierarchy includes at least two levels. The level one (L1) or upper-level cache is usually a private cache associated with a particular processor core and cannot be accessed by other cores in an MP system. Lower-level caches (e.g., level two (L2) or level three (L3) caches) may be private to a particular processor core or shared by multiple processor cores.

In conventional MP computer systems, store data of store operations are written one at a time into a cache memory or into a store gather buffer before writing to the cache memory. The store operations typically target only a small portion (i.e., 1 to 16 bytes) of the cache line instead of the entire cache line that is, for example, 128 bytes long. Since each of the L1, L2 caches and the store gather buffer has only one write port, store data of only one store operation can be written onto a cache line per processor cycle. In other words, two processor cycles are required to write store data of two store operations into a cache line within the L1 and L2 caches (or one cache line in the L1 cache and the L2 store gather buffer).

Consequently, it would be desirable to provide an improved technique for writing store data of multiple store operations into a cache line of a cache memory having only one write port in a single processor cycle.

BRIEF SUMMARY

In at least some embodiments, a load-store unit (LSU) of a processor core determines whether or not a second store operation specifies an update to a byte adjacent to a byte to be updated by a first store operation. Based on determining that the second store operation does not specify an update to a byte adjacent to a byte to be updated by the first store operation, the LSU writes the first store operation into the cache memory. The LSU can additionally determine whether or not the total length of store data of the first and second store operations exceeds the maximum write block size of a cache line. Based on determining that the second store operation specifies an update to a byte adjacent to a byte to be updated by the first store operation and that the total length of the first and second store operations does not exceed the maximum write block size of the cache line, the LSU merges the first and second store operations to obtain a merged store operation and writes store data of the merged store operation into a same write block of the cache line. Based on determining that the total length of the store data of the first and second store operations exceeds the maximum write block size of the cache line, the LSU splits the second store operation into first and second portions, merging the first portion of the second store operation with the first store operation to obtain a partially merged store operation, and writes store data of the partially merged store operation into the same write block of the cache line.

DETAILED DESCRIPTION

Figure 1:
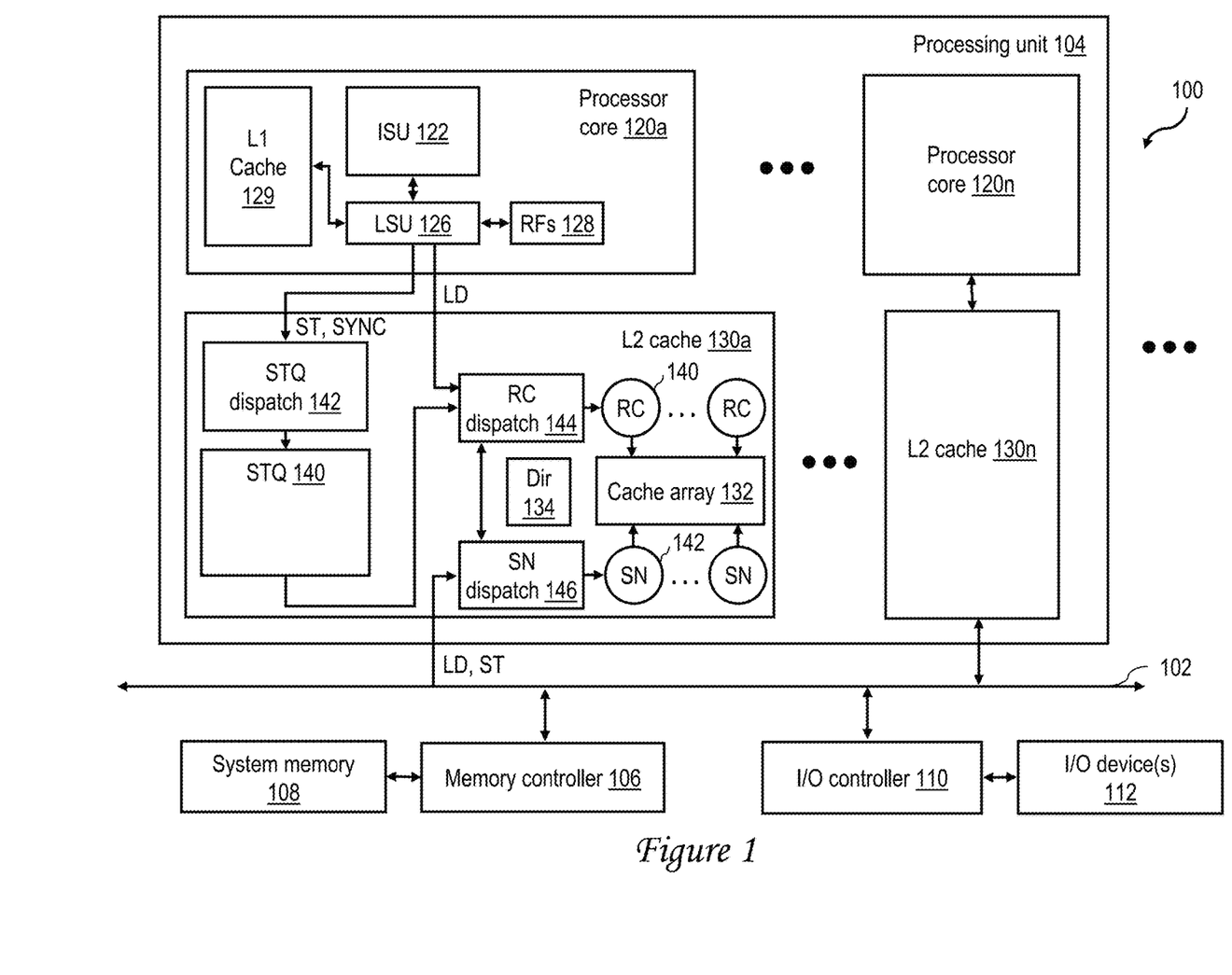
FIG. 1 is a block diagram of a data processing system in accordance with one embodiment.

Referring now to the drawings and in particular to FIG. 1, there is illustrated a block diagram of a multiprocessor (MP) data processing system 100 in accordance with one embodiment. MP data processing system 100 includes one or more processing units 104, each of which may be realized as a single integrated circuit chip. Processing units 104 are coupled for communication by an interconnect 102, which may be implemented, for example, with one or more buses and/or switches.

Interconnect 102 is further communicatively coupled to a memory controller 106, which provides an interface to a system memory 108, and also to an input/output (I/O) controller 110, which provides an interface to one or more I/O devices 112. Data and instructions residing in system memory 108 can generally be accessed, cached and modified by a processor core in any of processing units 104 within data processing system 100. System memory 108 thus forms the lowest level of memory in the distributed shared memory hierarchy of data processing system 100.

Each of processing units 104 includes one or more processor cores 120 (e.g., processor cores 120a-120n) for processing instructions and data. Although not required, in at least some embodiments, each of processor cores 120 is capable of independently executing multiple hardware threads of execution simultaneously. As shown, each of processor cores 120 includes an instruction sequencing unit (ISU) 122 that fetches and orders instructions for execution and one or more execution units, such as load-store unit (LSU) 126, for executing instructions. The instructions executed by LSU 126 include memory access instructions that request load or store access to a memory block in the distributed shared memory system. Portions of memory blocks obtained from the distributed shared memory system by load accesses are buffered in one or more register files (RFs) 128, and portions of memory blocks updated by store accesses are written to the distributed shared memory system from the one or more register files 128.

The operation of each of processor cores 120 is supported by a multi-level volatile memory hierarchy having at its lowest level shared system memory 108, and at its upper levels, one or more levels of cache memory, which in the illustrative embodiment include a store-through level one (L1) cache 129 within and private to each processor core 120, and a respective store-in level two (L2) cache 130 (e.g., L2 caches 130a-130n) for each of processor cores 120a-120n. Although the illustrated cache hierarchies include only two levels of cache, those skilled in the art will appreciate that alternative embodiments may include additional levels (such as L3, L4, etc.) of on-chip or off-chip, private or shared, in-line or lookaside cache, which may be fully inclusive, partially inclusive, or non-inclusive of the contents the upper levels of cache. The length of the cache lines held in the various levels of the cache hierarchy is 128 bytes, but the length may vary between embodiments.

During operation, when a hardware thread under execution by a processor core 120 includes a memory access instruction requesting a specified memory access operation to be performed, LSU 126 executes the memory access instruction to determine the target address (e.g., an effective address) of the memory access request. After translation of the target address to a real address corresponding to a storage location in system memory 108, L1 cache 129 is accessed utilizing the target address. Assuming the indicated memory access cannot be satisfied solely by reference to L1 cache 129, LSU 126 then transmits the memory access operation, which includes at least a transaction type (ttype) (e.g., load or store), the target real address, and if a store operation, the store data, to its affiliated L2 cache 130 for servicing.

L2 cache 130 includes a cache array 132 and a directory 134 of the contents of cache array 132. Assuming cache array 132 and directory 134 are set-associative as is conventional, memory locations in system memory 108 are mapped to particular congruence classes within cache array 132 utilizing predetermined index bits within the system memory (real) addresses. The particular memory blocks stored within the cache lines of cache array 132 are recorded in cache directory 134, which contains one directory entry for each cache line.

L2 cache 130 also includes a coalescing store queue (STQ) 140 interposed between processor core 120 and cache array 132. STQ 140 includes multiple entries for buffering store and barrier (e.g., SYNC) operations to be performed with respect to the distributed shared memory system. Store and barrier operations are loaded into STQ 140 by STQ dispatch logic 142. Like L1 cache 129, each of STQ 140 and cache array 132 of L2 cache 130a preferably includes only a single write port, meaning that only one store operation can be loaded into STQ 140 or have its store data written into cache array 132 in a single clock cycle. L2 cache 130 additionally includes multiple (e.g., 16) Read-Claim (RC) machines 140 for independently and concurrently servicing load (LD) and store (ST) operations originating from the affiliated processor core 120. In addition, L2 cache 130 includes multiple snoop (SN) machines 142 that can independently and concurrently handle remote memory access requests of other processor cores 120 that are snooped from interconnect 102. Store operations buffered within STQ 140 and load operations received from the affiliated processor core 120 are dispatched to RC machines 140 for processing in accordance with a prioritization and scheduling determined by RC dispatch logic 144. Similarly, memory access requests snooped from interconnect 102 are dispatched to SN machines 142 for processing in accordance with a prioritization and scheduling determined by SN dispatch logic 146.

Those skilled in the art will appreciate that MP data processing system 100 of FIG. 1 can include many additional non-illustrated components, such as interconnect bridges, non-volatile storage, ports for connection to networks or attached devices, etc. Because such additional components are not necessary for an understanding of the described embodiments, they are not illustrated in FIG. 1 or discussed further herein. It should also be understood, however, that the enhancements described herein are applicable to cache coherent data processing systems of diverse architectures and are in no way limited to the generalized data processing system architecture illustrated in FIG. 1.

In accordance with one embodiment, within a LSU, a second (next oldest) store operation of a thread can be merged with a first (oldest) store operation of the same thread if the second store operation is to be written to the same block of a cache memory as the first store operation. For example, when the second store operation has adjacent bytes before or after the bytes of the first store operation but still within the maximum write block size, the second store operation can be merged with the first store operation. If the second store operation has some bytes, but not all, with the same write block as the first store operation, then only a portion of the second store operation is merged with the first store operation. The remaining portion of the second store operation will be sent at a next processor cycle. For example, the remaining portion of the second operation can be merged with a third store operation if the third store operation has adjacent bytes before or after the bytes of the second store operation.

Figure 2:
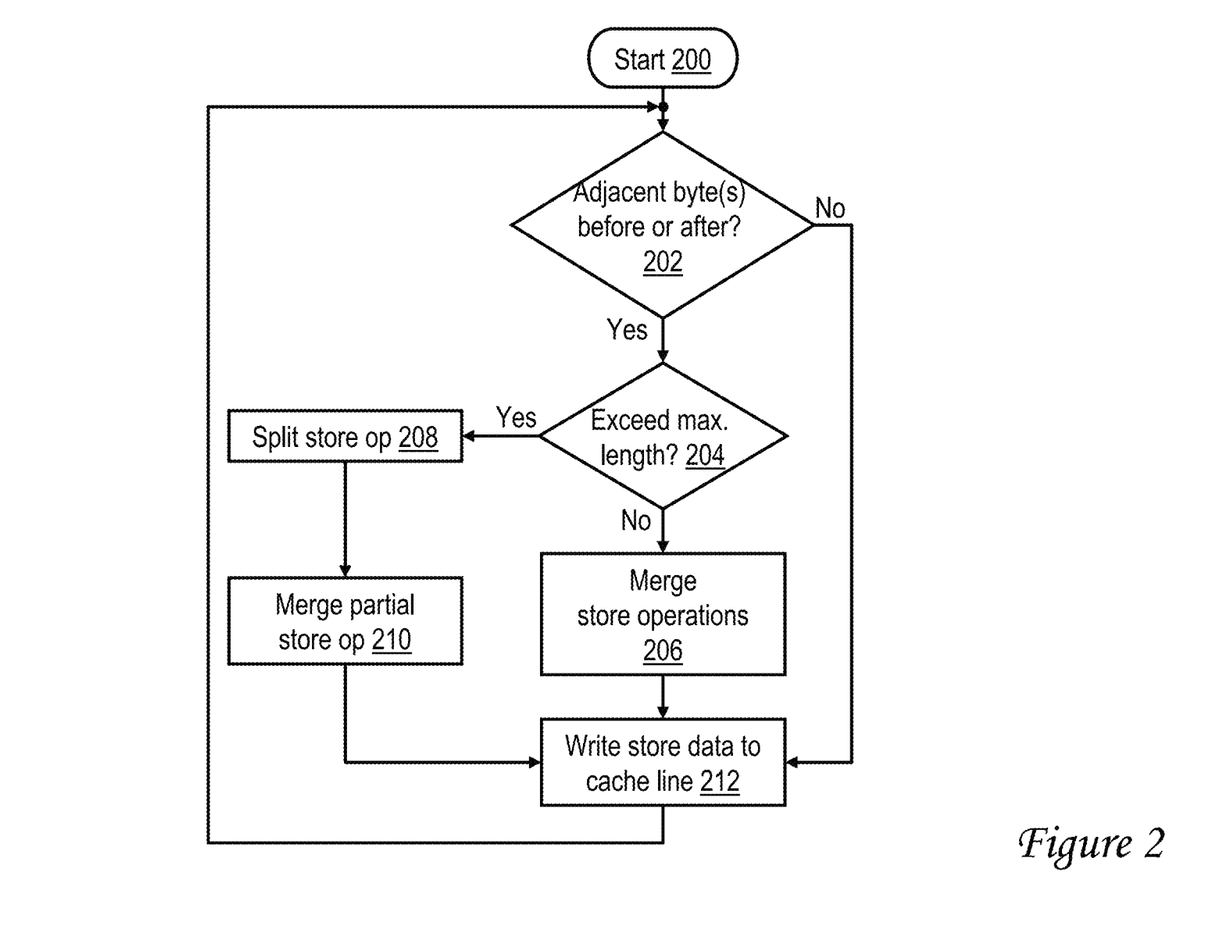
FIG. 2 is a high-level logical flowchart of a process for writing multiple store operations to a cache line in a single processor cycle, in accordance with one embodiment.
Figure 3A:
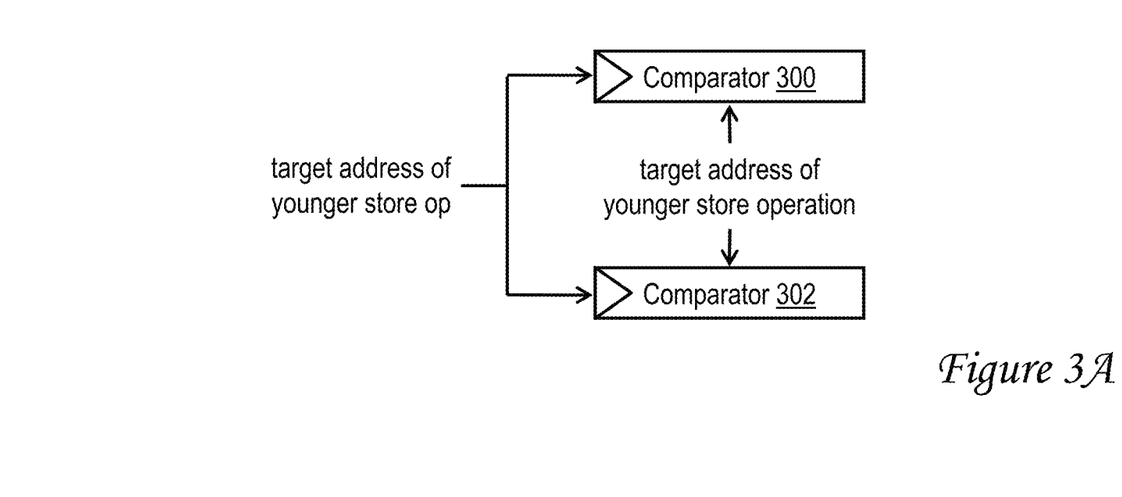
FIGS. 3A-3B are block diagrams showing various comparators.

With reference now FIG. 2, there is depicted a high-level logical flowchart of a process for writing multiple store operations to a cache line in a single processor cycle, in accordance with one embodiment. The process begins at block 200, for example, in response to receipt by LSU 126 of multiple store instructions from ISU 122. LSU 126 executes at least an older store instruction and a younger store instruction among the multiple store instructions to determine target addresses of data byte(s) in memory to be updated by older and younger store operations corresponding to the older and younger store instructions, respectively. At block 202, LSU 126 determines whether or not the younger store operation is intended to update adjacent byte(s) either before or after the byte(s) to be updated by the older store operation. As depicted in FIG. 3A, a comparator 300 can be used to compare the target address of the younger store operation with the target address of the older store operation to determine if the least significant bit (LSB) of the byte(s) to be updated by the younger store operation is/are immediately before the most significant bit (MSB) of the byte(s) to be updated by the older store operation. Similarly, a comparator 302 can be used to compare the target address of the younger store operation with the target address of the older store operation to determine if the MSB of the byte(s) to be updated by the younger store operation is/are immediately after the LSB of the byte(s) to be updated by the older store operation.

Figure 3B:
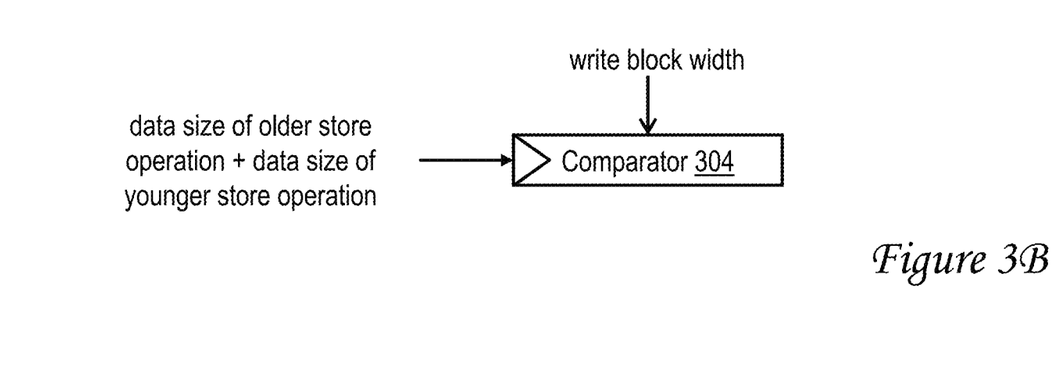

If, at block 202, LSU 126 determines the younger store operation does not update adjacent byte(s) either before or after the byte(s) to be updated by the older store operation, then the store data of the older store operation is written into a cache line within a cache memory (e.g., L1 cache 129 or STQ 142/STQ 140) separately from the store data of the younger storage operation, as depicted in block 212, and the process then returns to block 202. However, if the LSU 126 determines at block 202 that the younger store operation updates byte(s) adjacent the byte(s) to be updated by the older store operation, LSU 126 additionally determines at block 204 whether or not the total length of the data to be updated by the younger store operation and the older store operation is greater than the maximum write block size of a cache line. A comparator 304 can be used to compare the total data size to be updated by the younger store operation and the older store operation with the maximum write block size of a cache line, as depicted in FIG. 3B.

If LSU 126 determines at block 204 that the total data size of the younger store operation and the older store operation is not greater than (i.e., is less than or equal to) the maximum write block size of the cache line, then LSU 126 merges the entire younger store operation with the older store operation to obtain a fully merged store operation, as shown in block 206. The store data of the fully merged store operation is then written into the relevant write block in the target cache line, as depicted in block 212. However, if LSU 126 determines at block 204 that the total data size of the younger store operation and the older store operation exceeds the maximum write block size of the cache line, then LSU 126 splits the younger store operation into first and second portions, as depicted in block 208. In this case, only the first portion of the store data of the younger store operation is merged with the store data of the older store operation to form a partially merged store operation, as shown in block 210, and LSU 126 writes the store data of the partially merged store operation into the same write block of the cache line, as depicted in block 212. Note that this partially merged store operation (for which the store data includes a first portion of the store data of the younger store operation and all the store data of the oldest store operation) cannot have a data size greater than the maximum write block size of the cache line. Subsequently, the process returns to block 202. The unmerged second portion of the younger store operation can be written into another write block of the cache line by itself, or merged with another store operation before being written into another write block of a cache line, in a next processor cycle.

Alternatively, instead of determining whether or not the total length of the store data of the younger store operation and the older store operation is greater than the maximum write block size of a cache line (in block 204), LSU 126 may determine whether or not store data of the younger store operation and the oldest store operation, if merged, would cross a predetermined byte boundary for a cache line of the cache memory.

It is understood by those skilled in the art that if the store data of the store operation cannot be written to a cache memory, such as L1 cache 129, the store data of the store operation can be written to a store queue such as STQ 140.

Figure 4:
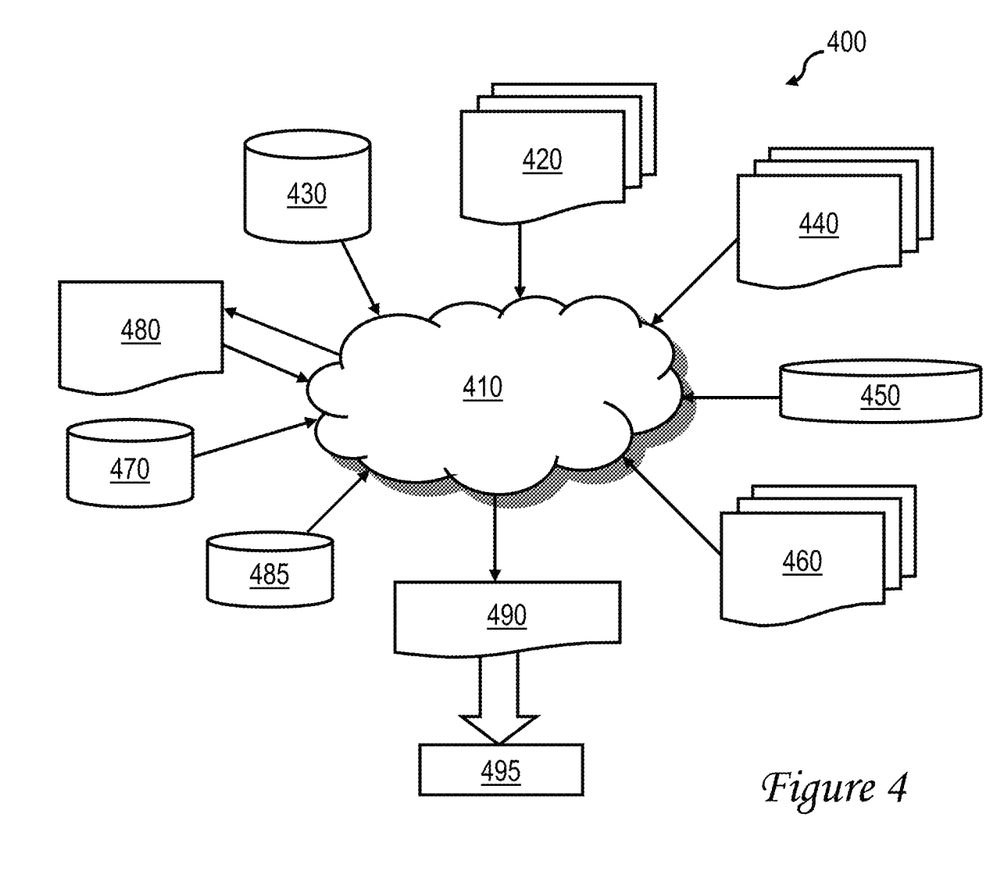
FIG. 4 is a data flow diagram illustrating a design process.

With reference now to FIG. 4, there is depicted a block diagram of an exemplary design flow 400 used for example, in semiconductor integrated circuit (IC) logic design, simulation, test, layout, and manufacture. Design flow 400 includes processes, machines and/or mechanisms for processing design structures or devices to generate logically or otherwise functionally equivalent representations of the design structures and/or devices described above and shown herein. The design structures processed and/or generated by design flow 400 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g., e-beam writers), computers or equipment for simulating design structures, any apparatus used in the manufacturing or test process, or any machines for programming functionally equivalent representations of the design structures into any medium (e.g., a machine for programming a programmable gate array).

Design flow 400 may vary depending on the type of representation being designed. For example, a design flow 400 for building an application specific IC (ASIC) may differ from a design flow 400 for designing a standard component or from a design flow 400 for instantiating the design into a programmable array, for example a programmable gate array (PGA) or a field programmable gate array (FPGA) offered by Altera Inc. or Xilinx Inc.

FIG. 4 illustrates multiple such design structures including an input design structure that is preferably processed by a design process 410. Design structure 420 may be a logical simulation design structure generated and processed by design process 410 to produce a logically equivalent functional representation of a hardware device. Design structure 420 may also or alternatively comprise data and/or program instructions that when processed by design process 410, generate a functional representation of the physical structure of a hardware device. Whether representing functional and/or structural design features, design structure 420 may be generated using electronic computer-aided design (ECAD) such as implemented by a core developer/designer. When encoded on a machine-readable data transmission, gate array, or storage medium, design structure 420 may be accessed and processed by one or more hardware and/or software modules within design process 410 to simulate or otherwise functionally represent an electronic component, circuit, electronic or logic module, apparatus, device, or system such as those shown herein. As such, design structure 420 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 410 preferably employs and incorporates hardware and/or software modules for synthesizing, translating, or otherwise processing a design/simulation functional equivalent of the components, circuits, devices, or logic structures shown herein to generate a netlist 480 that may contain design structures such as design structure 420. Netlist 480 may comprise, for example, compiled or otherwise processed data structures representing a list of wires, discrete components, logic gates, control circuits, I/O devices, models, etc. that describes the connections to other elements and circuits in an integrated circuit design. Netlist 480 may be synthesized using an iterative process in which netlist 480 is resynthesized one or more times depending on design specifications and parameters for the device. As with other design structure types described herein, netlist 480 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 410 may include hardware and software modules for processing a variety of input data structure types including netlist 480. Such data structure types may reside, for example, within library elements 430 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 440, characterization data 450, verification data 460, design rules 470, and test data files 485 which may include input test patterns, output test results, and other testing information. Design process 410 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 410 without deviating from the scope and spirit of the invention. Design process 410 may also include modules for performing standard circuit design processes such as timing analysis, verification, design rule checking, place and route operations, etc.

Design process 410 employs and incorporates logic and physical design tools such as HDL compilers and simulation model build tools to process design structure 420 together with some or all of the depicted supporting data structures along with any additional mechanical design or data (if applicable), to generate a second design structure 490. Design structure 490 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 420, design structure 490 preferably comprises one or more files, data structures, or other computer-encoded data or instructions that reside on transmission or data storage media and that when processed by an ECAD system generate a logically or otherwise functionally equivalent form of one or more of the embodiments of the invention shown herein. In one embodiment, design structure 490 may comprise a compiled, executable HDL simulation model that functionally simulates the devices shown herein.

Design structure 490 may also employ a data format used for the exchange of layout data of integrated circuits and/or symbolic data format (e.g., information stored in a GDSII (GDS2), GL1, OASIS, map files, or any other suitable format for storing such design data structures). Design structure 490 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown herein. Design structure 490 may then proceed to a stage 495 where, for example, design structure 490: proceeds to tape-out, is released to manufacturing, is released to a mask house, is sent to another design house, is sent back to the customer, etc.

As has been described, a LSU of a processor core determines whether or not a second store operation specifies an adjacent update to that specified by a first store operation. The LSU additionally determines whether the total store data length of the first and second store operations exceeds a maximum size. Based on determining the second store operation specifies an adjacent update and the total store data length does not exceed the maximum size, the LSU merges the first and second store operations and writes merged store data into a same write block of a cache. Based on determining that the total store data length exceeds the maximum size, the LSU splits the second store operation into first and second portions, merges the first portion with the first store operation, and writes store data of the partially merged store operation into the write block. The described technique increases the store write throughput for cases where one of the store operations does not cross a write block boundary.

While various embodiments have been particularly shown and described, it will be understood by those skilled in the art that various changes in form and detail may be made therein without departing from the spirit and scope of the appended claims and these alternate implementations all fall within the scope of the appended claims. For example, although aspects have been described with respect to a computer system executing program code that directs the functions of the present invention, it should be understood that present invention may alternatively be implemented as a program product including a computer-readable storage device storing program code that can be processed by a data processing system. The computer-readable storage device can include volatile or non-volatile memory, an optical or magnetic disk, or the like, but excludes signal media.

As an example, the program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures).

What is claimed is:

1. A method for writing store data of multiple store operations into a cache memory, said method comprising:
   determining whether or not a second store operation specifies an update to a byte adjacent to a byte to be updated by a first store operation;
   based on determining that the second store operation specifies the update to the byte adjacent to the byte to be updated by the first store operation, determining whether or not the total length of store data of the first and second store operations exceeds a maximum write block size of a cache line;
   based on determining that the total length of the store data of the first and second store operations does not exceed the maximum write block size of the cache line, merging the first and second store operations to obtain a fully merged store operation and writing store data of the fully merged store operation into a same write block of the cache line; and based on determining that the total length of the store data of the first and second store operations exceeds the maximum write block size of the cache line,
splitting the second store operation into first and second portions;
merging the first portion of the second store operation with the first store operation to obtain a first partially merged store operation; and
writing store data of the first partially merged store operation into the same write block of the cache line within the cache memory.

2. The method of claim 1, wherein the method further includes
merging the second portion of the second store operation with a third store operation to obtain a second partially merged store operation; and
writing the second partially merged store operation to a different write block of the cache line within the cache memory.

3. The method of claim 1, wherein the method further includes based on determining that the second store operation does not specify the update to the byte adjacent to the byte to be updated by the first store operation, writing the first store operation into the cache memory.

4. The method of claim 1, wherein the byte to be updated by the second store operation is located adjacent to a most significant bit of the byte to be updated by the first store operation.

5. The method of claim 1, wherein the byte to be updated by the second store operation is located adjacent to a least significant bit of the byte to be updated by the first store operation.

6. The method of claim 1, wherein writing store data of the fully merged store operation into a same write block of the cache line comprises writing the store data of the fully merged store operation into the write block is a single cycle of a processor core.

7. The method of claim 1, wherein the cache memory includes only one write port.

8. A processing unit, comprising:
a cache memory having a plurality of cache lines; and
a load-store unit (LSU) configured to perform:
determining whether or not a second store operation specifies an update to a byte adjacent to a byte to be updated by a first store operation;
based on determining that the second store operation specifies the update to the byte adjacent to the byte to be updated by the first store operation, determining whether or not the total length of store data of the first and second store operations exceeds a maximum write block size of a cache line;
based on determining that the total length of the store data of the first and second store operations does not exceed the maximum write block size of the cache line, merging the first and second store operations to obtain a fully merged store operation and writing store data of the fully merged store operation into a same write block of the cache line; and
based on determining that the total length of the store data of the first and second store operations exceeds the maximum write block size of the cache line,
splitting the second store operation into first and second portions;
merging the first portion of the second store operation with the first store operation to obtain a first partially merged store operation; and
writing store data of the first partially merged store operation into the same write block of the cache line within the cache memory.

9. The processing unit of claim 8, wherein the LSU further configured to perform
merging the second portion of the second store operation with a third store operation to obtain a second partially merged store operation; and
writing the second partially merged store operation to a different write block of the cache line within the cache memory.

10. The processing unit of claim 8, wherein the LSU further configured to perform based on determining that the second store operation does not specify the update to the byte adjacent to the byte to be updated by the first store operation, writing the first store operation into the cache memory.

11. The processing unit of claim 8, wherein the byte to be updated by the second store operation is located adjacent to a most or least significant bit of the byte to be updated by the first store operation.

12. The processing unit of claim 8, wherein writing store data of the fully merged store operation into a same write block of the cache line comprises writing the store data of the fully merged store operation into the write block is a single cycle of the processing unit.

13. The processing unit of claim 8, wherein the cache memory includes only one write port.

14. A data processing system, comprising:
a plurality of processing units in accordance with claim 8; and
an interconnect fabric coupling the plurality of processing units.

15. A design structure tangibly embodied in a machine-readable storage device for designing, manufacturing, or testing an integrated circuit, the design structure comprising:
a processing unit, comprising:
a cache memory having a plurality of cache lines; and
a load-store unit (LSU) configured to perform:
determining whether or not a second store operation specifies an update to a byte adjacent to a byte to be updated by a first store operation;
based on determining that the second store operation specifies the update to the byte adjacent to the byte to be updated by the first store operation, determining whether or not the total length of store data of the first and second store operations exceeds a maximum write block size of a cache line;
based on determining that the total length of the store data of the first and second store operations does not exceed the maximum write block size of the cache line, merging the first and second store operations to obtain a fully merged store operation and writing store data of the fully merged store operation into a same write block of the cache line; and
based on determining that the total length of the store data of the first and second store operations exceeds the maximum write block size of the cache line,
splitting the second store operation into first and second portions;
merging the first portion of the second store operation with the first store operation to obtain a first partially merged store operation; and writing store data of the first partially merged store operation into the same write block of the cache line within the cache memory.

16. The design structure of claim 15, wherein the LSU further configured to perform
merging the second portion of the second store operation with a third store operation to obtain a second partially merged store operation; and
writing the second partially merged store operation to a different write block of the cache line within the cache memory.

17. The design structure of claim 15, wherein the LSU further configured to perform based on determining that the second store operation does not specify the update to the byte adjacent to the byte to be updated by the first store operation, writing the first store operation into the cache memory.

18. The design structure of claim 15, wherein the byte to be updated by the second store operation is located adjacent to a most or least significant bit of the byte to be updated by the first store operation.

19. The design structure of claim 15, wherein writing store data of the fully merged store operation into a same write block of the cache line comprises writing the store data of the fully merged store operation into the write block is a single cycle of the processing unit.

20. The design structure of claim 15, wherein the cache memory includes only one write port.

* * * * *